Dec. 14, 1943.  C. E. TACK  2,336,969
SNUBBER
Filed July 10, 1940
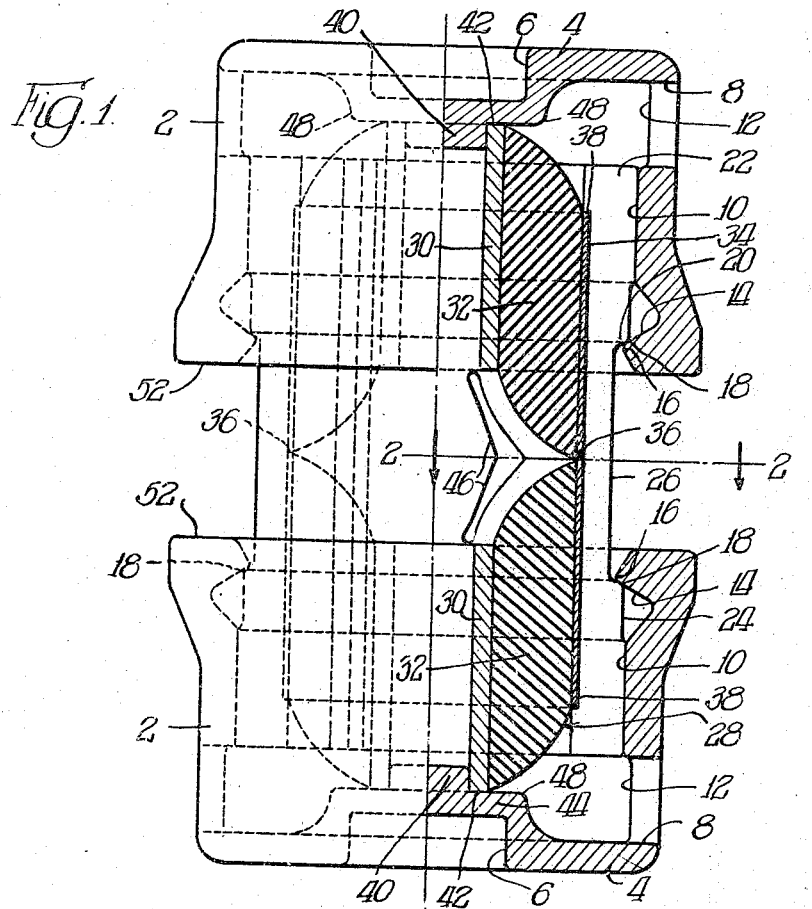
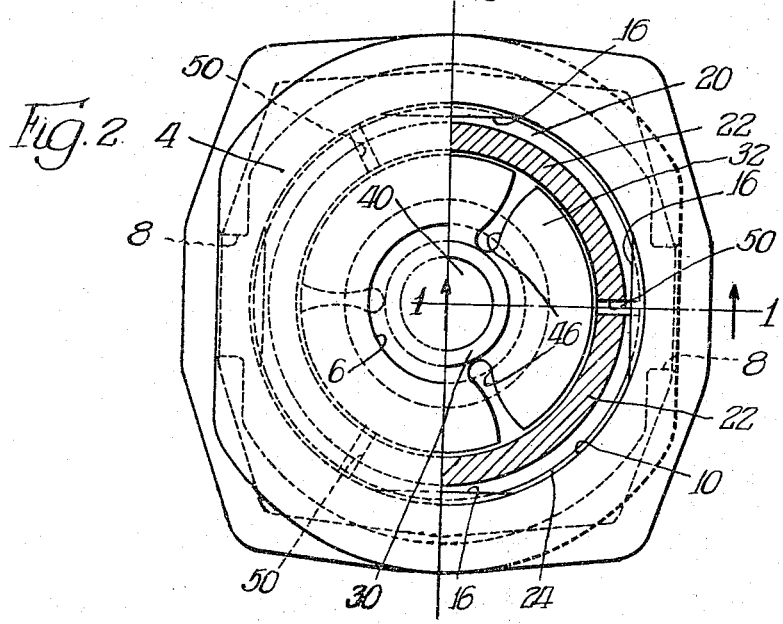
INVENTOR.
Carl E. Tack,
BY
ATTY.

Patented Dec. 14, 1943

2,336,969

UNITED STATES PATENT OFFICE 2,336,969

SNUBBER

Carl E. Tack, Chicago, Ill., assignor to American Steel Foundries, Chicago, Ill., a corporation of New Jersey Application July 10, 1940, Serial No. 344,674

26 Claims. (Cl. 267—9)

My invention relates to a friction absorbing device of form particularly suitable for use in a railway car truck, as for example in replacement of a standard coil spring. It will be understood, however, that the device affords certain novel characteristics which may be adapted for use under other conditions where it is desired to secure a substantially constant frictional absorption under conditions of varying load.

Under actual service conditions it has been observed that many friction absorbing devices build up capacity toward the end of the stroke to such an extent as to give shock characteristics to a spring group in which they are used and thus sometimes injure lading and inevitably increase the wear and tear on rolling stock.

A primary object of my invention is to produce a form of friction absorbing device which will furnish substantially constant frictional absorption throughout the stroke to which it is subjected substantially irrespective of the imposed load.

The load deflection graph of a rubber spring in shear has been observed to be substantially independent (within known limits) of the compression to which the rubber may be subjected while under load.

Experiment has indicated that the upper limit of such compression is in the neighborhood of 200 pounds per square inch, in other words, if a given rubber spring in shear supports a load of 100 pounds with a deflection of one-half an inch when the rubber is free of compression, the same rubber spring will be deflected substantially an equal amount under the same load when the rubber has been placed under compression not to exceed approximately 200 pounds a square inch.

From a practical standpoint, the compression load must be applied to the rubber approximately at right angles to the supported load, inasmuch as the rubber must be so positioned as to carry the load in shear. This principle may be availed of to afford substantially constant absorption of friction in a device such as set forth herein and such a device is eminently suitable for those conditions where it is desirable to maintain substantially constant absorption of friction under conditions of varying load. Such conditions sometimes prevail in railway cars where it is desirable to obtain a substantially constant amount of frictional absorption under varying load conditions and in such cases my novel friction absorbing device may be availed of to accomplish the desired purpose. As far as I am aware, no such friction absorbing device has ever before been described or used.

My novel device contemplates an arrangement where identical top and bottom followers may be used, said followers serving as seating means for opposite ends of the device and being formed with internal friction surfaces suitable for frictional engagement with friction shoes extending therebetween and maintained in operative engagement therewith by a rubber spring in shear. An efficient form of the device may be developed by the use of heat treated cast steel followers and hard cast iron shoes which normally develop satisfactory friction surfaces when in engagement with each other.

My invention comprehends such a form of resilient rubber pad functioning as a means of operating the device after closure, and also as a means of obtaining substantially constant pressure between the friction shoes and the followers.

Figure 1 is a side elevation, half in section, of a friction absorbing device embodying my invention, the section being taken substantially in the vertical plane bisecting the device as indicated by the line 1—1 of Figure 2.

Figure 2 is a top plan view, half in section, of the snubber shown in Figure 1, the section being taken substantially in the horizontal plane bisecting the device and as indicated by line 2—2 of Figure 1.

My novel friction absorbing device comprises identical top and bottom followers 2, 2, each a cup-like structure having a bottom wall 4 flat on its outer face to afford a seat for the device, and with a central cavity 6 formed on the outer face of said wall to serve as positioning means therefor when convenient. The base 4 is approximately circular in form and the integral walls extending outwardly therefrom are approximately cylindrical, but assume somewhat polygonal form at the open end of the follower. Adjacent the base 4, openings 8, 8 are formed in the side walls to facilitate drainage and escape of any extraneous matter, and the said side walls are formed with internal vertical cylindrical friction surfaces 10, 10 relieved adjacent the base as at 12, 12 and adjacent the open end of the follower as at 14, 14. Inwardly projecting lips 16, 16 may be formed at diametrically opposed portions of the side walls for abutment as at 18, 18 with annular shoulders 20, 20 formed at spaced intermediate points on each shoe 22. In the modification shown, each shoe 22 may be taken in the general form of a vertical section of a cylinder, three such shoes being accommodated within the followers and afforded friction surfaces for complementary engagement with the before mentioned internal friction surfaces 10, 10 formed on the followers. The friction surfaces of each shoe extend from opposite ends of the shoe inwardly to the relieved portion 24, said relieved portions extending to the before-mentioned shoulders 20, 20 which define the relatively thin central portion of the shoe as indicated at 26. Thus the frictional end portion of each shoe 22 is relatively thick and heavy to accommodate wear therealong, and the middle portion of each shoe is relieved as at 26 to accommodate movement therealong of the interlocking lips 16, 16 already referred to.

My novel form of compression and release spring assembly generally indicated at 28 is conveniently formed in halves in order to facilitate manufacturing operations. The respective halves are identical and each comprises a center spool or column 30 in the form of a small cylinder to which may be vulcanized a plurality of resilient pads 32, 32, each here shown substantially as a section of the cylinder with diagonal faces at opposite ends thereof. On the outer cylindrical face of each pad 32 may be vulcanized a relatively thin cylindrical plate 34 whose outer face is complementary in form to the inner face of the abutting friction shoes. The plates 34, 34 of the respective halves of the resilient units 28 may seat against each other as at 36, 36 along the horizontal plane bisecting the friction absorbing device and the opposite extremities of the plates 34, 34 may seat against shoulders as at 38, 38 formed on the shoes 22, 22.

It will be understood that the plates 34, 34 may extend for the length of the resilient element 28 instead of being formed in halves abutting each other as at 36, 36, and the device will function similarly in either case but I have shown these external plates 34, 34 as formed in two halves in abutment with each other in order to facilitate the manufacturing operation. My invention thus contemplates an arrangement wherein the plates 34, 34 extend from end to end of the resilient unit 28.

The end wall 4 of each end follower 2 is formed with an internal central positioning lug 40 which may be received within the spool 30 of the adjacent end of the resilient unit 28, thus fixing the position of said spool with respect to said follower, and the said spool 30 may seat as at 42 against the internally projecting portion 44 of the end wall 4.

As already stated, each half of the resilient member 28 may be formed as a unit here shown as comprising a center spool 30, a plurality of resilient pads vulcanized thereto but spaced from each other as shown at 46, 46 and a plate 34 vulcanized to the radially outer face of each pad 32. The two halves of the spring unit 28 of a single friction absorbing device with the friction shoes 22, 22, may be assembled and clamped together so as to admit them within the end followers after which the clamp may be released and the device is then ready for installation and operation. Figure 1 shows such a device after assembly in its released position with the rubber pads 32, 32 under some degree of compression and therefor bulging at their free edges as may be noted at 46, 46. As the device is placed under load and the followers move toward each other, the rubber pads 32, 32 will be further distorted and will flow into the spaces therebetween as well as into the end portions of the followers. The said distortion, however, will not appreciably affect the pressure exerted by said rubber pads against the friction shoes, and the friction developed between said shoes and the followers will be substantially constant. It may be noted that the internal surfaces of the followers along which the rubber will flow as the device is compressed and released are afforded smooth radii as at 48, 48, thus preventing the abrasion of the resilient member. The friction faces on the followers and on the abutting shoes are co-extensive, and both the shoes and the followers are relieved at the edges of the friction surfaces in order to prevent the formation of shoulders therealong as the friction surfaces are worn down in operation. Some slight clearance is afforded between the vertical edges of the friction shoes as at 50, 50 (Figure 2) to facilitate assembly and to accommodate varying degrees of compression of the rubber springs.

The operation of the device will be readily understood by those skilled in the art. It may be noted that the resilient pads 32, 32 of each spring unit 28 are placed in shear to carry the vertical load and are placed under compression to expand the friction shoes outwardly against the friction surfaces of the housings. The opposed annular inner edges or faces of the followers afford stop means limiting the length of the structure, and may abut each other as at 52, 52. After assembly the parts of the device are maintained in operative relationship by the shoulders 20, 20 on the shoes in abutment with the lips 16, 16 on the followers as already described.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction absorbing device, top and bottom followers of cup-like form presenting substantially cylindrical internal friction surfaces, friction shoes interlocked with said followers, each of said shoes having friction faces in complementary engagement with the surfaces on said housings, and a resilient unit under compression between said shoes and said housings and comprising internal rigid members spaced longitudinally of said device, and external rigid members in abutment with each other centrally of said device, and resilient pads vulcanized between said rigid members, said internal rigid members having their remote ends in abutment with said followers respectively, and said external rigid members having their remote ends in abutment with stop means on the adjacent shoes whereby said resilient pads are distorted in shear as said device is compressed.

2. In a friction absorbing device, spaced followers presenting internal friction surfaces with relieved areas at the edges thereof, a plurality of spaced friction shoes interlocked with said followers and having external friction faces in complementary engagement with said surfaces and co-extensive therewith, relieved areas adjacent the edges of said friction faces, a resilient unit in compression between said shoes and said followers, said resilient unit including a pair of identical members each comprising a central rigid column fixed with respect to the adjacent follower, a plurality of external rigid members fixed with respect to said shoes, and spaced rubber pads vulcanized between the respective external members and the adjacent portions of said column and under compression therebetween.

3. In a friction absorbing device, spaced identical followers presenting internal friction surfaces with relieved areas at the edges thereof, a plurality of spaced friction shoes interlocked with said followers and having external friction faces in complementary engagement with said surfaces, and a resilient unit in compression between said shoes and said followers, said resilient unit comprising identical end portions each having internal and external rigid members with a plurality of spaced rubber pads vulcanized therebetween, said internal rigid member being fixed with respect to the adjacent follower, and said external rigid member being fixed with respect to said shoes so that the intervening rubber pad is distorted in shear as said device is compressed.

4. In a friction absorbing device, top and bottom followers having internal friction surfaces, a plurality of friction shoes interlocked with said followers and having friction faces in complementary engagement with said surfaces, and a resilient unit under compression between said followers and shoes and comprising internal and external rigid members and resilient pads vulcanized therebetween, said internal rigid members having engagement with said followers and said external rigid members having abutment with each other and fixed relationship with said shoes whereby compression of said device places said resilient pads in shear, and said pads operate to release said device after compression and to maintain said shoes in frictional engagement with said followers.

5. In a friction absorbing device, top and bottom followers of cup-like form presenting substantially cylindrical internal friction surfaces, friction shoes interlocked with said followers, each of said shoes having friction faces in complementary engagement with the surfaces on said housings, and a resilient unit under compression between said shoes and said housings and comprising internal rigid members spaced longitudinally of said device, and external rigid members in abutment with each other centrally of said device, and resilient pads vulcanized between said rigid members, said external rigid members having fixed relationship with the adjacent shoes whereby said resilient pads are flexed in shear as said device is compressed.

6. In a friction absorbing device, top and bottom housings of cup-like form presenting substantially cylindrical internal friction surfaces, friction shoes interlocked with said followers, each of said shoes having friction faces in complementary engagement with the surfaces on said housings, and a resilient unit under compression between said shoes and said housings and comprising internal rigid members spaced longitudinally of said device, and external rigid members in abutment with each other centrally of said device, and resilient pads vulcanized between said rigid members, said resilient pads being radially spaced from each other to permit further compression thereof as said device is placed under load.

7. In a friction absorbing device, spaced followers presenting internal friction surfaces with relieved areas at the edges thereof, a plurality of spaced friction shoes interlocked with said followers and having external friction faces in complementary engagement with said surfaces, a resilient unit in compression between said shoes and said followers, said resilient unit being formed as a pair of identical members, each of said identical members having an internal rigid column, and a plurality of spaced external rigid members fixed with respect to said shoes, and spaced rubber pads vulcanized respectively between said external rigid members and said internal rigid column.

8. In a friction absorbing device, end followers presenting internal friction surfaces defined by relieved areas, friction shoes interlocked with said followers and having friction faces in complementary engagement with said surfaces and substantially co-extensive therewith, and a composite resilient element under compression between said followers and shoes, said resilient element comprising identical portions associated with the respective followers, each portion having a rigid central member fixed with respect to the adjacent follower, a rigid external member fixed with respect to the adjacent shoes, and a rubber pad vulcanized between said rigid members and under compression therebetween.

9. In a friction absorbing device, end followers presenting substantially cylindrical internal friction surfaces and relieved areas adjacent the edges of said surfaces, a plurality of spaced friction shoes interlocked with said followers and presenting at their opposite ends friction faces in complementary engagement with the friction surfaces of the respective followers, a resilient unit under compression between said shoes and followers and comprising internal rigid elements in engagement with said followers, and external rigid elements fixed with respect to said shoes, and a resilient pad compressed between said rigid elements and subjected to shear distortion as said device is compressed.

10. In a friction absorbing device, spaced identical followers of cup-like form presenting internal friction surfaces with relieved areas at the edges thereof, a plurality of spaced friction shoes interlocked with said followers and having external friction faces in complementary engagement with said surfaces and co-extensive therewith, relieved areas adjacent the edges of said friction faces, and a resilient unit in compression between said shoes and said followers and comprising internal rigid elements fixed with respect to said followers, external rigid elements fixed with respect to said shoes, and a resilient pad vulcanized between said rigid elements and compressed therebetween.

11. In a friction absorbing device, identical end followers presenting generally cylindrical internal friction surfaces defined by relieved areas, a plurality of spaced friction shoes interlocked with said followers and having complementary friction faces in engagement with said surfaces and co-extensive therewith, a resilient unit under compression between said shoes and followers, said resilient unit comprising a pair of elements and each element having an internal rigid column fixed with respect to the adjacent follower, a plurality of external rigid members fixed with respect to said shoes, and spaced rubber pads vulcanized between the respective external members and said rigid column.

12. In a friction absorbing device, end followers presenting internal friction surfaces defined by relieved areas, a plurality of friction shoes interlocked with said followers, each shoe having at its remote ends friction faces in complementary engagement with said friction surfaces, and a composite resilient element under compression between said followers and shoes and comprising spaced internal rigid columns fixed with respect to the respective followers, rigid external columns abutting each other and fixed with respect to said shoes, and spaced rubber pads vulcanized between said rigid columns at each end of the device.

13. In a friction absorbing device, end followers presenting substantially cylindrical internal friction surfaces and relieved areas adjacent the edges of said surfaces, a plurality of spaced friction shoes interlocked with said followers and presenting at their opposite ends friction faces in complementary engagement with the friction surfaces of the respective followers, a resilient unit under compression between said shoes and followers and comprising internal rigid elements in engagement with said followers, and external rigid elements fixed with respect to said shoes, and a resilient pad compressed between said rigid elements.

14. In a friction absorbing device, top and bottom followers of cup-like form presenting substantially cylindrical internal friction surfaces, friction shoes interlocked with said followers, each of said shoes having friction faces in complementary engagement with the surfaces on said followers, and a resilient unit under compression between said shoes and said followers and comprising internal rigid members spaced longitudinally of said device, and external rigid members in abutment with each other centrally of said device, and resilient pads vulcanized between said rigid members.

15. In a friction absorbing device, top and bottom followers having internal friction surfaces, a plurality of friction shoes interlocked with said followers and having friction faces in complementary engagement with said surfaces, and a resilient unit under compression between said followers and shoes and comprising internal and external rigid members and resilient pads vulcanized therebetween, said internal rigid members having engagement with said followers, and said external rigid members having abutment with each other and fixed relationship with said shoes.

16. In a friction absorbing device, end followers presenting internal friction surfaces of substantially cylindrical form, a plurality of friction shoes interlocked between said followers with friction faces engaging said surfaces, and a composite resilient element under compression between said shoes and followers and comprising an external substantially rigid column fixed with respect to said shoes, spaced internal rigid columns fixed to the respective followers, and a plurality of spaced resilient pads compressed between each internal column and said external column.

17. In a friction absorbing device, spaced identical followers presenting internal friction surfaces with relieved areas at the edges thereof, a plurality of spaced friction shoes interlocked with said followers and having external friction faces in complementary engagement with said surfaces, and a resilient unit in compression between said shoes and said followers, said resilient unit comprising identical end portions each having internal and external rigid members with a plurality of spaced rubber pads vulcanized therebetween.

18. In a friction absorbing device, spaced followers presenting internal friction surfaces defined by relieved areas, friction shoes interlocked with said followers and having friction faces in complementary engagement with said surfaces, and a composite resilient element under compression between said followers and said shoes and including spaced internal rigid columns fixed to the respective followers and external rigid columns fixed with respect to said shoes, and a resilient member vulcanized between said columns.

19. In a friction device, end followers presenting internal friction surfaces, spaced friction shoes interlocked with said followers and presenting friction faces in complementary engagement with said surfaces, and a resilient unit under compression between said shoes and followers and comprising internal rigid elements movable with said followers respectively and external rigid elements fixed with respect to said shoes, and resilient means flexed between said internal and external elements.

20. In a snubber, top and bottom followers presenting internal friction surfaces, friction shoes interlocked with said followers and having friction faces engaging said surfaces, and a resilient unit compressed by said shoes and said followers and comprising spaced rigid members and a flexible member joining said rigid members.

21. In a snubber, spaced followers having internal friction surfaces, friction shoes interlocked with the followers and presenting friction faces engaging said surfaces, and a resilient unit compressed by said shoes and followers, said unit comprising a rigid member engaging a follower, a rigid member engaging a shoe, and a resilient member flexed between said rigid members.

22. In a snubber, top and bottom followers having friction surfaces, friction shoes interlocked between said followers with friction faces engaging said surfaces, and a composite resilient unit compressed by said shoes and followers and comprising an external rigid column fixed with respect to said shoes, an internal rigid column fixed with respect to a follower, and a resilient means flexible between said columns.

23. In a snubber, opposite followers with friction surfaces, friction shoes engaging said surfaces, and a resilient unit compressed by said shoes and followers and comprising identical end portions each having internal and external rigid members with a resilient member flexed therebetween.

24. In a snubber, spaced followers with friction surfaces, friction shoes engaging said surfaces, and a composite resilient unit compressed by said followers and shoes and including a rigid column fixed with respect to a follower, a rigid column fixed with respect to a shoe, and resilient means flexed between said columns.

25. In a snubber, opposite followers presenting friction surfaces, friction shoes extending between said followers and engaging said surfaces, and a resilient unit compressed by said shoes and followers and comprising a rigid member fixed with respect to a follower, a rigid member fixed with respect to a shoe, and means flexed between said rigid members.

26. In a snubber, opposite followers presenting internal friction surfaces, friction shoes extending between said followers and engaging said surfaces, and a resilient unit comprising spaced rigid means secured to respective followers and extending between said shoes, and resilient means compressed between and fixed to each rigid means and said shoes.

CARL E. TACK.